United States Patent [19]
Bruengger

[11] Patent Number: 5,056,065
[45] Date of Patent: Oct. 8, 1991

[54] SYSTEM FOR DEPLOYING HORIZONTAL LINE ARRAY

[75] Inventor: Craig V. Bruengger, Marshfield, Mass.

[73] Assignee: Hazeltine Corporation, Greenlawn, N.Y.

[21] Appl. No.: 383,485

[22] Filed: Jul. 24, 1988

[51] Int. Cl.⁵ .............................................. H04B 1/59
[52] U.S. Cl. ............................................ 367/4; 367/3
[58] Field of Search ........................................ 367/3, 4

[56] References Cited

U.S. PATENT DOCUMENTS

| | | | |
|---|---|---|---|
| 3,944,964 | 3/1976 | Loeser et al. | 367/4 |
| 3,973,236 | 8/1976 | McLaughlin | 367/16 |
| 4,004,265 | 1/1977 | Woodruff et al. | 367/4 |
| 4,571,788 | 2/1986 | Bruengger | 364/4 |

Primary Examiner—Ian J. Lobo
Attorney, Agent, or Firm—E. A. Onders; W. B. Ritchie

[57] ABSTRACT

A sonobuoy system and method for deploying an array of transducers in a substantially horizontal line at a desired depth below the surface of a body of water. The trailing end of the array is deployed first, allowed to descend, and suspended at the desired operating depth. The leading end of the array is then released, allowed to descend slowly, and suspended at the desired operating depth. A drag device attached to the trailing end of the array causes the trailing end of the array to be stretched out away from the leading end, thereby maintaining the array in a substantially horizontal line at the desired depth. The system and method make it possible to deploy horizontal line arrays in a minimum of time and at shallow depths.

8 Claims, 3 Drawing Sheets

SYSTEM FOR DEPLOYING HORIZONTAL LINE ARRAY

This invention was made with Government support under Contract F30602-83-C-0107 awarded by the Department of the Air Force. The Government has certain rights in this invention.

FIELD OF THE INVENTION

The invention relates to a system for rapidly deploying from a sonobuoy a line array of electro-acoustic transducers and for positioning the array horizontally at a desired depth below the water's surface.

BACKGROUND OF THE INVENTION

The use of arrays of electro-acoustic transducers deployed from sonobuoys has a variety of applications in military and commercial fields. A commercial application Consists of using such an array to receive reflected acoustic waves in oil exploration surveys. Submarine detection is the principle use in the military field. While individual sonobuoys having a single transducer or a vertical line array of transducers are useful for some applications, other applications require the use of an array of multiple transducers arranged in a horizontal line at a predetermined depth below the water's surface, sometimes extending over a substantial distance.

Typically, such horizontal array systems comprise a horizontal line array, consisting of a cable having a plurality of transducers mounted thereon at a selected interval, and vertical suspension cables, attached to the leading and trailing ends of the horizontal array cable and including selected motion isolation and drag inducing components. In the prior art, such systems have been deployed sequentially. That is, first the trailing end vertical suspension cable is paid out from the deploying sonobuoy, followed by the array cable, and finally the leading end vertical suspension cable. The system then is allowed to stabilize, with the leading and trailing end suspension cables in a vertical attitude and the array in a horizontal attitude.

While the above described deployment method is satisfactory for some applications, other applications require that the transducer array be deployed very rapidly or at a shallow depth. But, the time required for deployment is a function of the length of the horizontal array and the length of the suspension cables, the latter of which also determines the depth at which the array will be deployed. For example, a deployment time of thirty minutes is desirable for some applications. However, due to the length of the array involved and the time required for the array to reach the desired operating depth, the prior art sequential method of deployment has been unable to achieve the desired thirty-minute deployment time.

It is, therefore, an object of the present invention to provide a new and improved system for rapidly deploying a horizontal line array of electroacoustic transducers from a sonobuoy, as well as new sonobuoys employing such system.

SUMMARY OF THE INVENTION

In accordance with the present invention there is provided a sonobuoy system for deploying an array of transducers at a predetermined depth below the water surface in predetermined time. The system has a cable having a plurality of transducers attached to it, and a containment means for containing said cable and capable of floating at or near the surface of the water. The system also has a cable control means for causing the trailing end and leading end of the cable to be set at a predetermined depth below the water's surface. When the cable control means selectively releases the trailing end of said cable upon the sonobuoy system being deployed in the water, the cable control means permits the trailing end of the cable to descend to a predetermined depth. When the predetermined depth is reached, the cable is then held until the predetermined time has elapsed. After the elapse of the predetermined time, the leading end of the cable is selectively released and allowed to descend to the predetermined depth.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
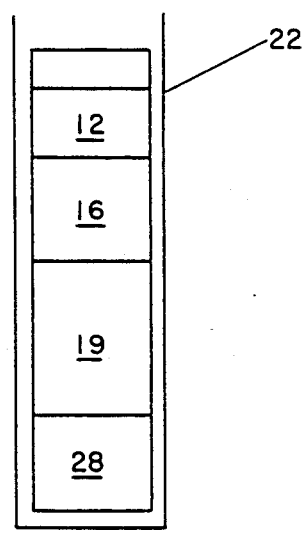
FIG. 1 illustrates a sonobuoy, embodying the invention, in its packaged state, ready for deployment.

FIG. 1 shows the a sonobuoy 10, typically cylindrical in form, which embodies the invention and is ready for deployment. The sonobuoy is usually launched from a plane or ship by dropping the sonobuoy into the water. If launched from a plane, the sonobuoy housing 22 would normally include means for suitably slowing its descent, such as rotor blades or a parachute, in a manner well known in the art.

The sonobuoy housing 22 includes a surface float 12 that is releasably connected to cable container 16, which houses the leading end array suspension cable. Cable container 16 is preferably cylindrically shaped with the diameter of the cylinder approximately equal to the diameter of the cylindrical portion of the surface float 12. Cable container 16 is also releasably attached to array container 19, which contains the array cable and its transducers, and has a diameter corresponding to the diameter of float 12 and cable container 16. Cable container 28, which houses the trailing end suspension cable, also preferably has a cylindrical shape of approximately the same diameter as the other elements and is releasably attached to array container 19.

Figure 2:
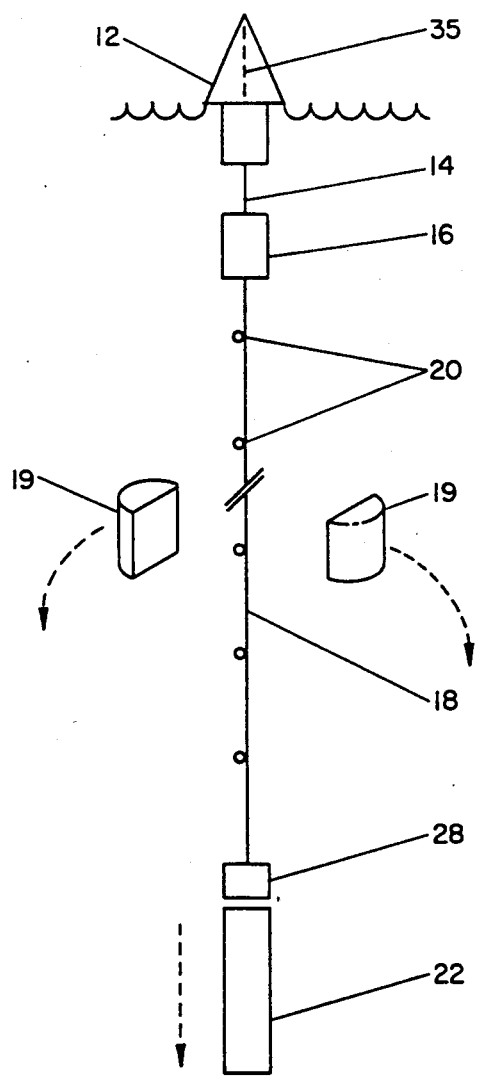
FIG. 2 illustrates the first phase of deployment of a horizontal line array from the sonobuoy of FIG. 1.

FIG. 2 shows sonobuoy 10 shortly after it has been dropped into the water. Surface float 12 slides out of housing 22, inflates and remains at the surface of the water throughout the use of the system. Float 12 includes an antenna 35 and associated electronics, for transmitting information collected by the array of transducers after it is deployed.

Cable container 16 slides out of housing 22 and drops away from float 12 but remains attached to float 12 by a connecting member 14, which is preferably a compliant cable containing one or more electrical leads carry signals from the array to the electronics package in float 12. Cable container 16 contains leading end suspension cable 29, damper device 32 and array electronics package 34. The weight of descent housing 22 and cable container 28 causes array cable, having transducers 20 affixed thereto at a selected interval, to be paid out from array container 19. Array container 19 is constructed in separable halves which separate and fall away as shown. Eventually, cable container 28 slides out of housing 22 and the housing falls away as shown in FIG. 2.

Figure 3:
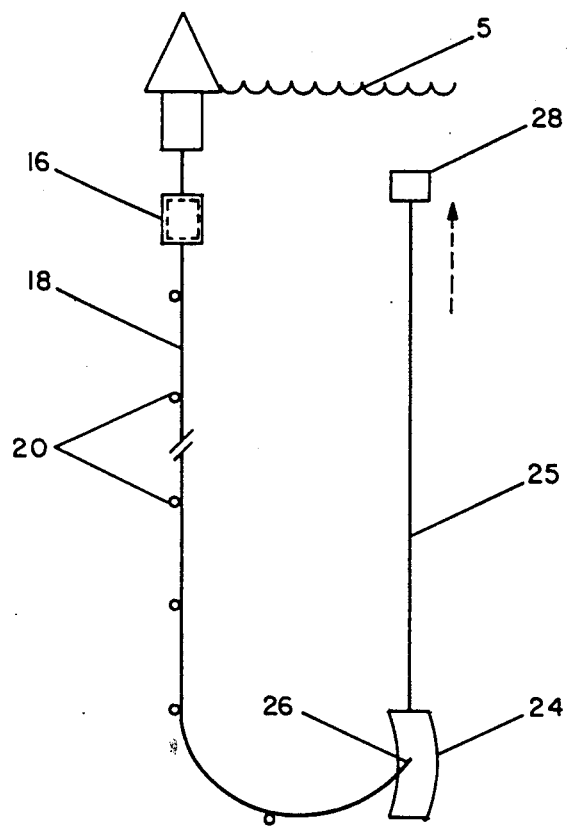
FIG. 3 illustrates the beginning of the second phase of deployment.

FIG. 3 shows the beginning of the second phase of the deployment of the horizontal line array system. After housing 22 drops away, cable container 28, which is buoyant and contains trailing end suspension cable 25 and drag device 24, is free to float toward the water's surface but remains attached to array cable 18 via connecting member 26. The combination of floating container 28 and trailing end suspension cable 25 serves to keep the trailing end of the array cable 18 at a predetermined depth below the water's surface determined by the length of cable 25. Since connecting member 26 connects the trailing end of array cable 18 to the combination of drag device 24 and the lower end of suspension cable 25 and is not required to provide electrical connection, nylon line or other flexible cable is suitable. Connected between connecting member 26 and the lower end of cable 25 is drag device 24, which may be a drogue. Drag device 24 impedes the drift Of the trailing end of array cable 18 relative to float 12, while float 12 is free to drift with the prevailing surface current. This causes cable 18 to be stretched out in an angular configuration as shown in FIG. 4.

Figure 4:
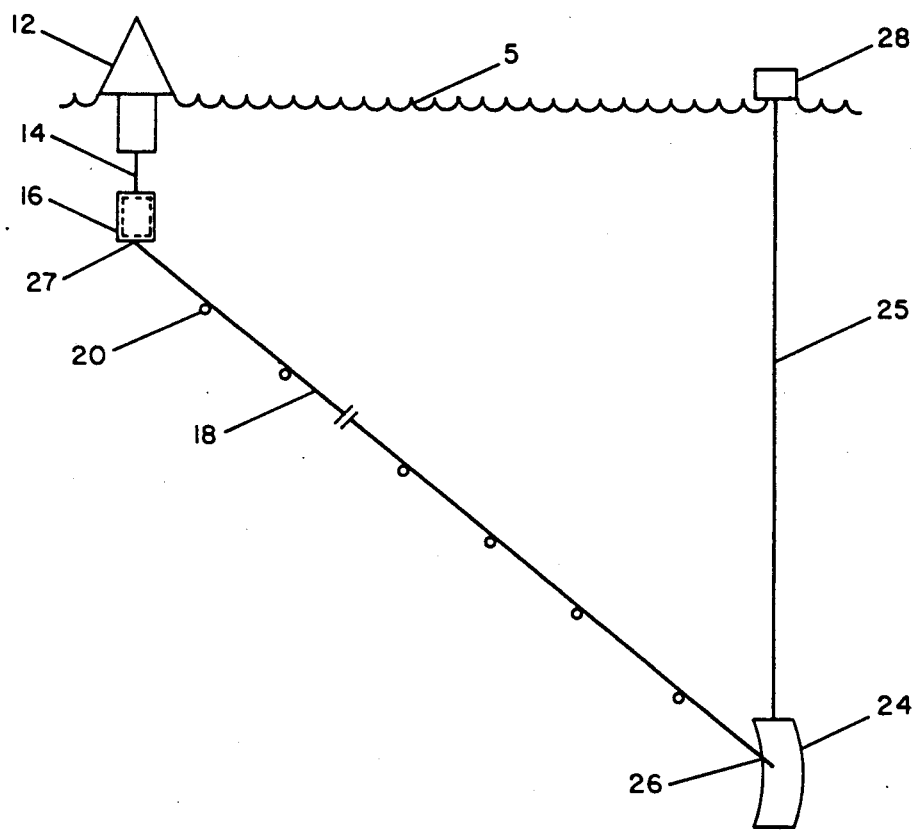
FIG. 4 illustrates the position of the array at the end of the second phase of deployment.

FIG. 4 shows the final position of the line array 18/20 at the end of the second phase of deployment, when the array is deployed to maximum extension. The time required to complete this phase varies depending on the length of the array and suspension cables. At the end of this timed phase, leading end 27 of cable 18 is released from cable container 16 via a preset timing mechanism.

Figure 5:
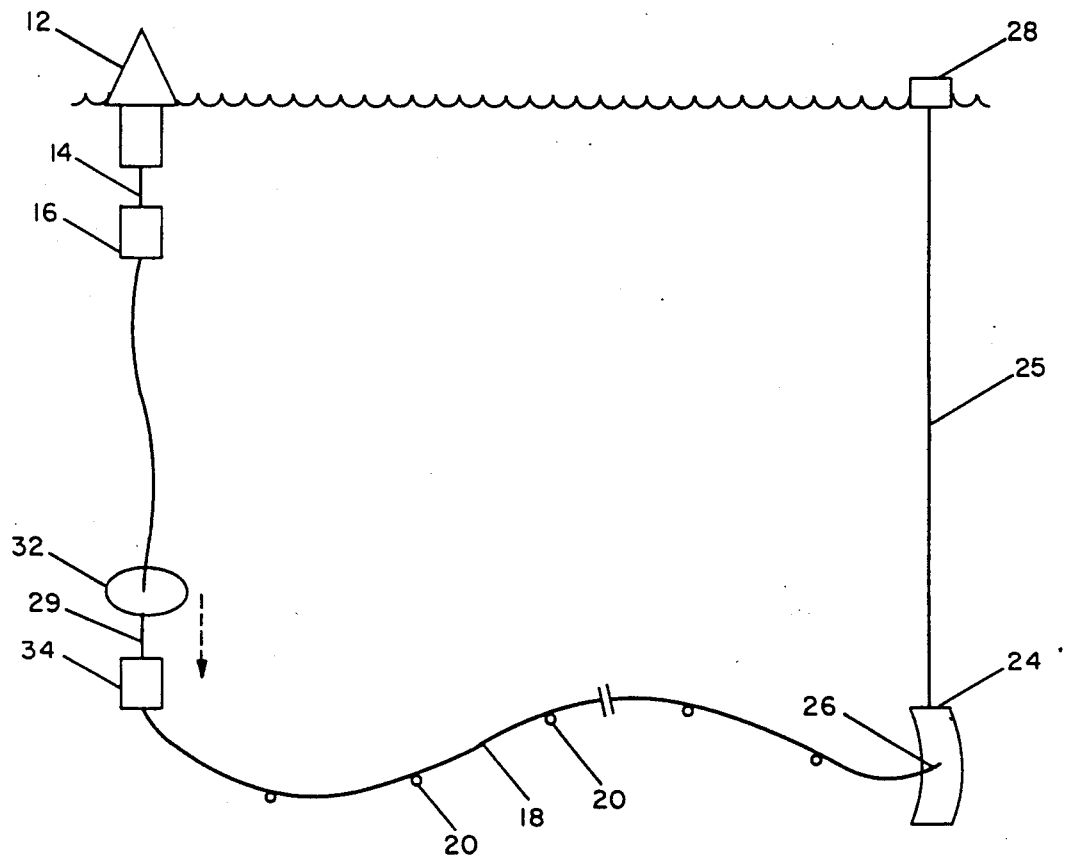
FIG. 5 illustrates the third phase of the deployment.

FIG. 5 shows the third phase of deployment. Array electronics container 34, which had been releasably contained within cable container 16, is released and descends with leading end 27 of cable 18 attached to it. Container 34 remains connected to cable container 16 by means of leading end suspension cable 29, which may be a compliant Cable for example. In order to prevent container 34 from descending too rapidly, which may cause suspension cable 29 to tangle B with array cable 18, leading end drag device 32 is attached along suspension cable 29 near container 34. Drag device 32 thus slows the descent of container 34.

After a predetermined length of suspension cable 29 is released from cable container 16, the array 18/20 is free to assume its fully deployed state.

Figure 6:
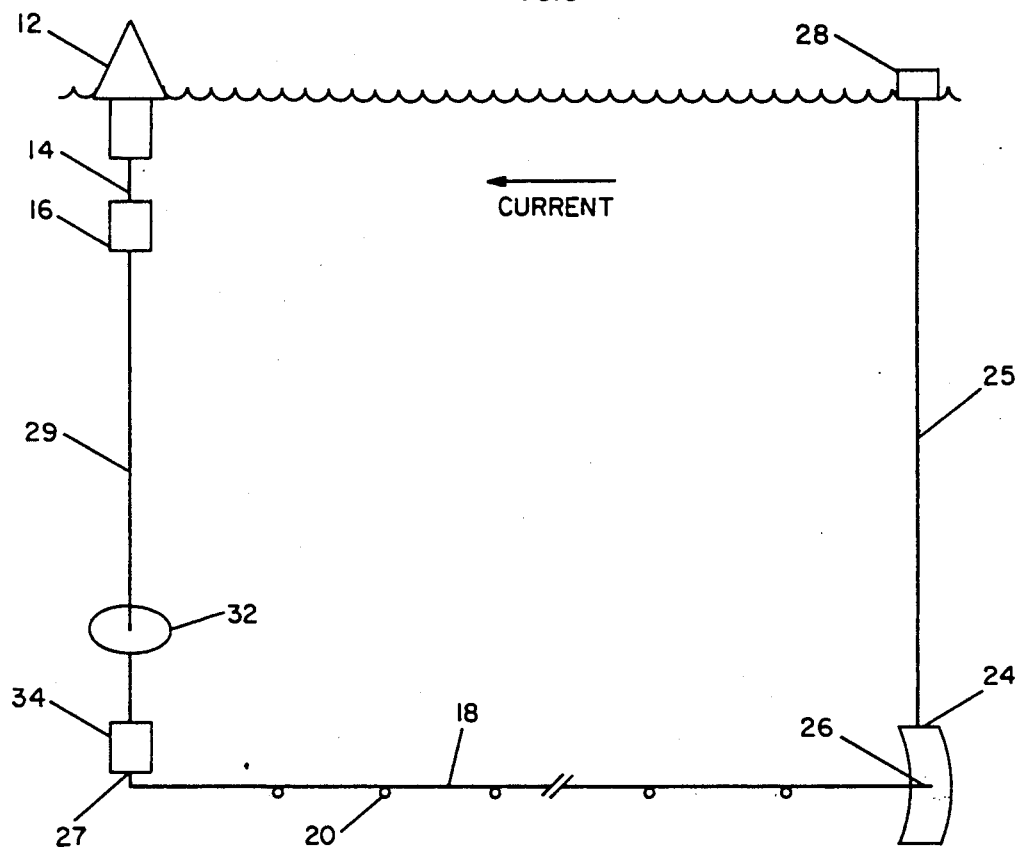
FIG. 6 is a view of the invention in its fully deployed state, showing the transducer array in a horizontal position at the desired depth below the surface of the water

FIG. 6 illustrates the horizontal line array 18/20 in its fully deployed state. Array cable 18 is suspended from float 12 at the leading end by suspension cable 29 and from float 28 at the trailing end by suspension cable 25. Thus array 18/20 is positioned approximately parallel to the surface of the water and at a predetermined depth below the surface corresponding to the lengths of suspension cables 25 and 29. Array cable 18 is kept in a reasonably taut condition because: (a) leading end float 12 is larger and therefore has more drag area than trailing end float 28, and (b) float 12 drifts in higher current than trailing end drag device 24, which is located deeper where lower current speeds exists. As shown in FIG. 6, it is assumed that the prevailing general current flow is from right to left. The horizontal line array deployment method and system described herein has several distinct advantages over prior art methods and systems. First, it is capable of deploying arrays in a shorter time than if a conventional sequential approach is used. Second, it is easier to package in sonobuoy housings of standard shape and size, enabling standard launching methods and devices to be used. Third, the depth at which the array is deployed is easily Controlled and the array may be deployed in shallower water than is possible with the conventional sequential approach. Fourth, the deployed array can remain on station and approximately parallel to the water's surface for an extended time. This permits information to be derived from the horizontal array which is not obtainable from a single transducer or from a vertical array of transducers.

While there has been described what is at present considered to be the preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A sonobuoy system for deploying an array of transducers in a substantially horizontal line at a predetermined depth below the surface of a body of water having prevailing surface and subsurface currents, comprising:

an array cable having a plurality of transducers affixed thereto, and having a leading end and a trailing end;

means for suspending the leading end of said array cable at a predetermined depth below the surface of said water;

means for suspending the trailing end of said array cable at a predetermined depth below the surface of said water and for impeding the drift o& said trailing end relative to said leading end;

means for controlling the deployment of said array cable and said suspension means;

wherein, said control means releases the trailing end of said array cable and said trailing end suspension means after said sonobuoy system is deposited in the water, permitting said trailing end to descend until said predetermined depth is reached while restraining the leading end of said cable until a first predetermined time has elapsed, then releasing the leading end of said array cable after said first predetermined time has elapsed, allowing the leading end of said array cable to descend to said predetermined depth.

2. The system of claim 1, wherein said leading and trailing end suspension means each includes means having sufficient buoyancy to support its respective end of the array cable.

3. The system of claim 2, wherein said trailing end suspension means includes a suspension member coupled between the trailing end of said array cable and the associated buoyant means, said trailing end suspension member being of sufficient length to suspend the trailing end of said array cable from the associated buoyant means at said predetermined depth.

4. The system of claim 3, wherein said trailing end suspension means further includes a drag inducing member coupled to the trailing end of said array cable for impeding the drift of said trailing end relative to the buoyant means associated with the leading end of said array cable and therefore said leading end.

5. The system of claim 4, wherein said leading end suspension means includes a suspension member coupled between the leading end of said array cable and the associated buoyant means, said leading end suspension member being of sufficient length to suspend the leading end of said array cable from the associated buoyant means at said predetermined depth.

6. The system of claim 5, wherein said leading end suspension means also includes a drag inducing member coupled between said leading end suspension member and the leading end of said array cable, for slowing the descent of said leading end after said leading end is released by said control means.

7. The system of claim 6, wherein the buoyant means associated with the leading end of said array cable includes means for transmitting information derived from the transducers which are part of said array cable, and wherein said leading end suspension means includes means for translating information from said array to said transmitting means.

8. A method for deploying from a sonobuoy in a body of water an array of transducers in a substantially horizontal line at a predetermined depth in the water, comprising the steps of:
 (1) releasing the trailing end of said array from said sonobuoy and allowing said end to decend in said water;
 (2) suspending said trailing end at said predetermined depth while imposing horizontally oriented drag thereon, thereby causing said array to initially assume an angular configuration relative to the surface of said water;
 (3) releasing the leading end of said array while imposing vertically oriented drag thereon, thereby allowing said end to descend slowly, and suspending said leading end at said predetermined depth;
 whereby the drag acting on the trailing end of said array will eventually extend said array in a substantially horizontal line at said predetermined depth.

* * * * *